(12) United States Patent
Bando

(10) Patent No.: US 8,511,419 B2
(45) Date of Patent: Aug. 20, 2013

(54) STEERING SYSTEM

(75) Inventor: Yuki Bando, Shiki-gun (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/347,932

(22) Filed: Jan. 11, 2012

(65) Prior Publication Data
US 2012/0181102 A1   Jul. 19, 2012

(30) Foreign Application Priority Data

Jan. 13, 2011 (JP) ................... 2011-005026

(51) Int. Cl.
*B62D 5/04* (2006.01)

(52) U.S. Cl.
USPC ......................................... 180/444; 180/443

(58) Field of Classification Search
USPC ......................................... 180/443, 444, 446
See application file for complete search history.

(56) References Cited

U.S. PATENT DOCUMENTS

2007/0209861 A1* 9/2007 Kruttschnitt et al. ......... 180/444

FOREIGN PATENT DOCUMENTS

| DE | 10 2007 002 684 A1 | 7/2008 |
| DE | 10 2007 055 901 A1 | 8/2009 |
| DE | 10 2008 001 959 A1 | 12/2009 |
| EP | 1 693 281 A2 | 8/2006 |
| JP | A-2005-343434 | 12/2005 |

OTHER PUBLICATIONS

Feb. 6, 2013 European Search Report issued in European Patent Application No. 12150795.8.

* cited by examiner

*Primary Examiner* — Kevin Hurley
*Assistant Examiner* — Marc A Scharich
(74) *Attorney, Agent, or Firm* — Oliff & Berridge, PLC

(57) ABSTRACT

A steering system includes a motor that rotates a power transmitting member, a rotating body to which rotative power of the motor is transmitted via the power transmitting member, a rack shaft that is driven in its axial direction according to rotation of the rotating body, a rack housing that houses the rack shaft and the rotating body, and a bearing interposed between the rack housing and the rotating body. A receiving portion of the rotating body which engages with the power transmitting member is provided at an opposed surface as a portion of an outer circumferential surface of the rotating body which is opposed to an output shaft of the motor, and the bearing is provided on a non-opposed surface other than the opposed surface.

14 Claims, 8 Drawing Sheets

STEERING SYSTEM

INCORPORATION BY REFERENCE

The disclosure of Japanese Patent Application No. 2011-005026 filed on Jan. 13, 2011 including the specification, drawings and abstract is incorporated herein by reference in its entirety.

BACKGROUND OF THE INVENTION

1. Field of the Invention

The invention relates to a steering system including a motor that rotates a power transmitting member, a rotating body to which rotative power of the motor is transmitted via the power transmitting member, a rack shaft that is driven in an axial direction in accordance with rotation of the rotating body, a rack housing that houses the rack shaft, and a bearing interposed between the rack housing and the rotating body.

2. Description of Related Art

A known example of the steering system as described above is described in, for example, Japanese Patent Application Publication No. 2005-343434 (JP-A-2005-343434). In the steering system, the motor is positioned such that the direction in which the rack shaft is driven and the direction in which an output shaft of the motor extends are generally in parallel with each other, and the motor is disposed outside a peripheral wall of the rack housing that houses the rack shaft. On the other hand, the rack shaft is supported by the rack housing, via a ball screw, nut, and a bearing.

In the meantime, there has been a demand to reduce space as measured in the direction in which the rack shaft and the output shaft of the motor are arranged, in the steering system. Namely, there has been a demand to reduce the center distance between the axis of the rack shaft and the axis of the output shaft of the motor.

SUMMARY OF THE INVENTION

The invention provides a steering system in which the distance between a rack shaft and an output shaft of a motor is small.

A steering system according to one aspect of the invention includes a power transmitting member, a motor that rotates the power transmitting member, a rotating body to which rotative power of the motor is transmitted via the power transmitting member, a rack shaft that is driven in an axial direction thereof in accordance with rotation of the rotating body, a rack housing that houses the rack shaft and the rotating body, and a bearing interposed between the rack housing and the rotating body. In the steering system, an outer circumferential surface of the rotating body includes an opposed surface that is opposed to an output shaft of the motor, and a non-opposed surface other than the opposed surface, and the rotating body has a receiving portion that is provided at the opposed surface and engages with the power transmitting member, while the bearing is provided on the non-opposed surface.

According to the above aspect of the invention, the bearing is provided on the non-opposed surface of the rotating body, namely, the bearing is not provided between the motor and the rack housing. Therefore, the space between the motor and the rack housing can be reduced, and the center distance between the axis of the output shaft of the motor and the axis of the rack shaft can be reduced.

In the steering system according to the above aspect of the invention, the rack housing may include a first housing that supports the rack shaft via the bearing, and houses a portion of the rack shaft, and a second housing that houses another portion of the rack shaft, and supports the motor.

In the steering system as described above, the rack shaft is supported by the first housing, and the motor is supported by the second housing. With this arrangement, each component of a power transmitting mechanism that transmits rotative power of the motor to the rack shaft is supported by the rack housing, so that the position of each component of the power transmitting mechanism relative to the motor is prevented from being shifted or changed.

In the steering system according to the above aspect of the invention, the rotating body may include a driven body to which the rotative power of the motor is transmitted via the power transmitting member, and a screw mechanism that rotates with the driven body and converts the rotative power into linear motion of the rack shaft, and the rack shaft may be driven in the axial direction in accordance with rotation of the screw mechanism, while the bearing may be interposed between the rack housing and the driven body. In this steering system, the rack housing may include a third housing that houses a portion of the rack shaft, and supports the motor, the power transmitting member, the driven body, and the bearing, which are mounted on the third housing, and a fourth housing that houses another portion of the rack shaft, and the fourth housing and the motor may not overlap each other as viewed in a radial direction of the rack shaft.

In the steering system as described above, the fourth housing does not support the motor, and is positioned so as not to overlap the motor as viewed in the radial direction of the rack shaft. Namely, the fourth housing is provided separately from the motor, which makes it possible to remove the fourth housing without removing the motor from the third housing. With this arrangement, the rack shaft and the screw mechanism can be removed from the third housing, in a condition where the motor remains on the third housing.

The steering system as described above may further include a seal member that fills a clearance between the third housing and the fourth housing, and a clearance between the third housing and the motor.

When the steering system has a first structure in which the bearing is provided on the non-opposed surface as a part of the outer circumferential surface of the rotating body, and a second structure in which one housing (the third housing) supports the motor, power transmitting member, driven body, and the bearing, which are mounted thereon, the steering system naturally has the following structure.

Namely, since the rack shaft, power transmitting member, and the driven body are located in a connecting portion of the third housing, the connecting portion has an elliptical shape. On the other hand, a connecting portion of the other housing generally has a substantially circular shape, and a connecting portion of the motor has a circular shape. Therefore, if the fourth housing and the motor are connected to the connecting portion of the third housing, a clearance(s) may be formed in the connecting portion, and air-tightness cannot be ensured.

In the steering system as described above, on the other hand, the seal member fills the clearance between the third housing and the fourth housing, and fills the clearance between the third housing and the motor, thus assuring air-tightness.

In the steering system as described above, the seal member may be constructed so that no clearance is formed between the motor and the seal member when the motor is moved so as to change a distance between the rack shaft and the output shaft of the motor.

With the above arrangement, even if the motor is moved for adjustment of the position of the motor, for example, no clearance is formed between the motor and the seal member, and therefore, air-tightness of the steering system can be ensured.

According to the invention, the steering system in which the center distance between the rack shaft and the output shaft of the motor is small can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
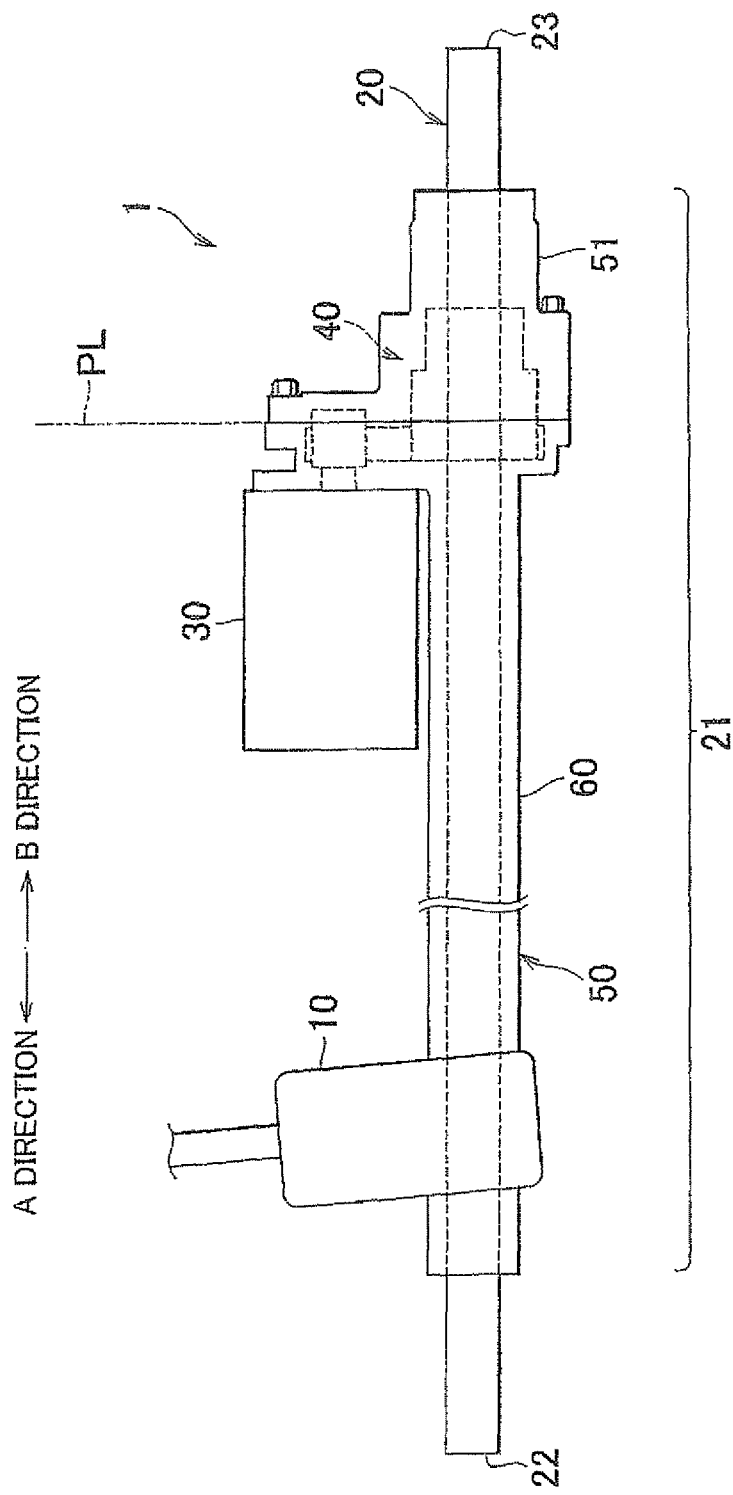
FIG. 1 is a schematic view schematically showing the overall structure of a steering system according to a first embodiment of the invention.

Referring to FIG. 1 through FIG. 5, a first embodiment of the invention will be described. FIG. 1 shows the overall construction of a steering system 1 as the first embodiment of the invention.

The steering system 1 converts rotary motion of a steering shaft into linear motion by means of a rack-and-pinion mechanism 10, and transmits the linear motion to a rack shaft 20, so as to operate steered wheels connected to distal end portions of the rack shaft 20. The linear motion of the rack shaft 20 is assisted by power of a motor 30. The rotative power of the motor 30 is transmitted to the rack shaft 20, via a gear mechanism 40 that converts the rotative power into linear motion.

A middle portion 21 of the rack shaft 20 is housed in a rack housing 50 made of aluminum. End portions of the rack shaft 20 protrude outward from the rack housing 50. The rack-and-pinion mechanism 10 is provided at a location spaced from a first end 22 of the rack shaft 20 by a suitable distance. The gear mechanism 40 is mounted on the rack shaft 20 at a location spaced from a second end 23 of the rack shaft 20 by a suitable distance.

In the following description, the direction from the second end 23 to the first end 22 of the rack shaft 20, namely, the direction from a portion of the rack shaft 20 in which the gear mechanism 40 is provided to a portion thereof in which the rack-and-pinion mechanism 10 is provided, will be referred to as "A direction". The direction opposite to the A direction will be referred to as "B direction".

The rack housing 50 is divided into two housings, i.e., a first housing 51 and a second housing 60. Where PL denotes a position at which the first housing 50 and the second housing 60 are joined to each other in FIG. 1, the first housing 51 houses a portion of the rack shaft. 20 which extends from the position PL in the B direction, and the second hosing 60 houses a portion of the rack shaft 20 which extends from the position PL in the A direction. The motor 30 and the rack-and-pinion mechanism 10 are mounted on the second housing 60.

Figure 2:
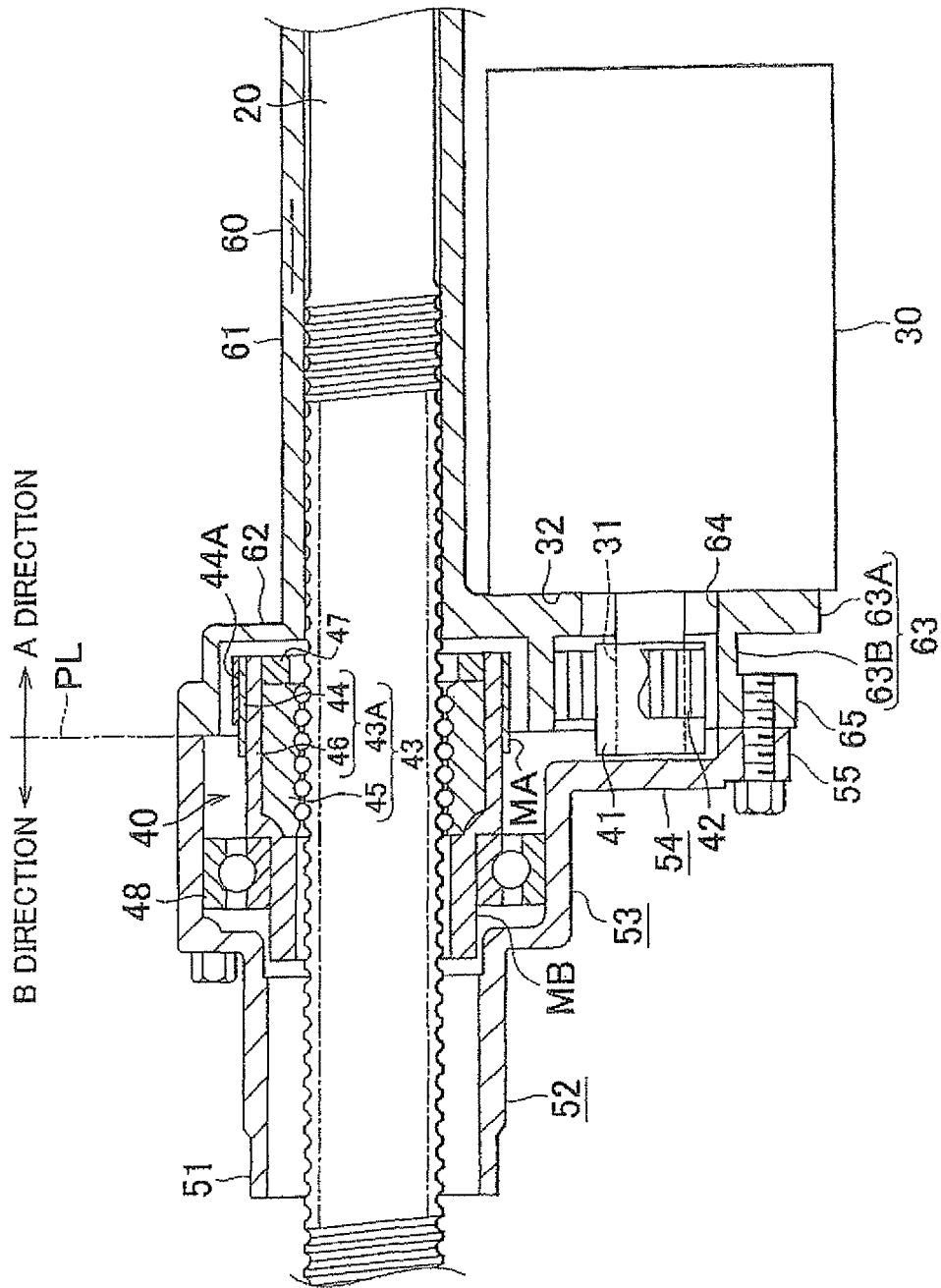
FIG. 2 is a cross-sectional view showing a cross-sectional structure of a gear mechanism in the steering system of the first embodiment.

Referring to FIG. 2, the structure of the gear mechanism 40, and the positional relationship between the gear mechanism 40 and the rack housing 50 will be described. FIG. 2 is an enlarged view of a cross-section of the gear mechanism 40, which is rotated 180 degrees from the position shown in FIG. 1.

The gear mechanism 40 includes a first pulley 41 mounted on an output shaft 31 of the motor 30, a belt 42 (a power transmitting member) that transmits rotative power of the first pulley 41, a second pulley 44 to which the rotative power of the first pulley 41 is transmitted via the belt 42, a nut case 46 mounted on to the inside of the second pulley 44, and a ball screw 45 mounted on to the inside of the nut case 46. A lock nut 47 for fixing the ball screw 45 in position is fitted in an end portion of the nut case 46.

The second pulley 44 is formed with a receiving portion 44A over which the belt 42 is looped. The second pulley 44, nut case 46, and the ball screw 45 are secured to each other, so as to rotate as a unit. The ball screw 45 is mounted on the rack shaft 20. The rack shaft 20 moves in the axial direction in accordance with rotation of the ball screw 45.

In the following description, a structure constituted by the nut case 46 and the second pulley 44 will be called "driven body 43A", and a structure constituted by the driven body 43A and the ball screw 45 will be called "nut 43 (rotating body)". A portion of the outer circumferential surface of the nut 43, which is opposed to the output shaft 31 of the motor 30, will be called "opposed surface MA", and the remaining portion of the outer circumferential surface of the nut 43, other than the opposed face MA, will be called "non-opposed surface MB".

A bearing 48 has an inner ring provided on the non-opposed surface MB as a part of the outer circumferential surface of the nut 43, and an outer ring provided on the inner circumferential surface of the first housing 51. Namely, the bearing 48 is disposed between the nut ease 46 and the first housing, 51. On the other hand, the receiving portion 44A is located at the opposed surface MA as a part of the outer circumferential surface of the nut 43.

The gear mechanism 40 operates in the following manner. The motor 30 rotates the first pulley 41. The rotative power of the first pulley 41 is transmitted to the second pulley 44 via the belt 42, so that the second pulley 44, nut case 46, and the ball screw 45 rotate as a unit. With the ball screw 45 thus rotated, the rack shaft 20 moves in the axial direction. Namely, the amount of movement of the rack shaft 20 is controlled, by controlling the rotational speed and the amount of rotation of the motor 30.

The first housing 51 includes a first housing portion 52 that houses a portion of the rack shaft 20, and a second housing portion 53 that extends from an end portion of the first housing portion 52 and houses a portion of the nut 43. The first housing 51 further includes a third housing portion 54 that is located adjacent to the second housing portion 53 and houses a distal end portion of the first pulley 41.

The second housing 60 includes a fourth housing portion 61 that houses a portion of the rack shaft 20, and a fifth housing portion 62 that extends from an end portion of the fourth housing portion 61 and houses a portion of the nut 43. The second housing 60 further includes a sixth housing portion 63 that is formed adjacent to the fifth housing portion 62 and houses a portion of the first pulley 41 of the motor 30. The sixth housing portion 63 consists of a support wail 63A that protrudes outward from a peripheral wall of the fourth housing portion 61 and supports the motor 30, and a peripheral wall 63B that is provided on the support wall 63A and surrounds the periphery of the first pulley 41. The support wall 63A is formed with an insertion hole 64 through which the output shaft 31 is inserted.

The second housing portion 53 and third housing portion 54 of the first housing 51 provide a connecting portion (which will be called "first connecting portion 55") connected to the second housing 60, The fifth housing portion 62 and sixth housing portion 63 of the second housing 60 provide a connecting portion (which will be called "second connecting portion 65") connected to the first housing 51. With the first connecting portion 55 and the second connecting portion 56 abutting on each other, the first housing 51 and the second housing 60 are connected to each other, so that the gear mechanism 40 is housed in the rack housing 50.

Figure 3:
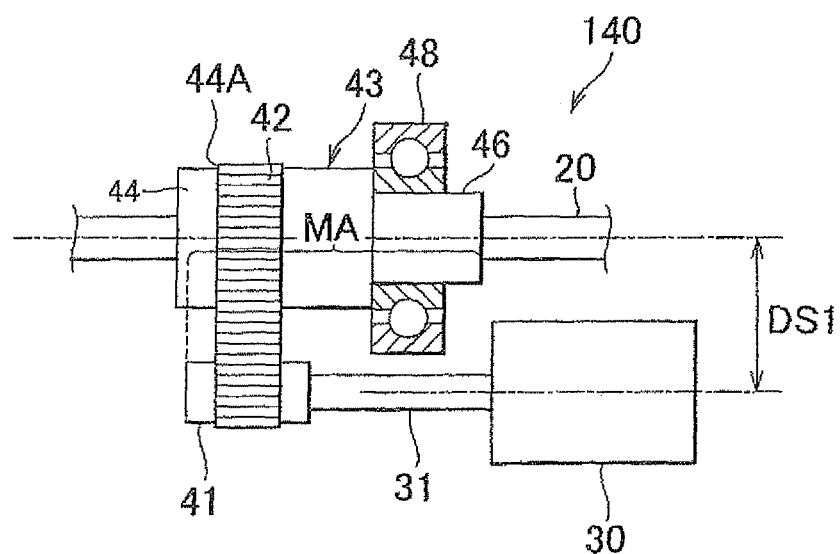
FIG. 3 is a schematic view showing a general structure of a gear mechanism, in a steering system having a known structure, for comparison with the steering system of the first embodiment.
Figure 4:
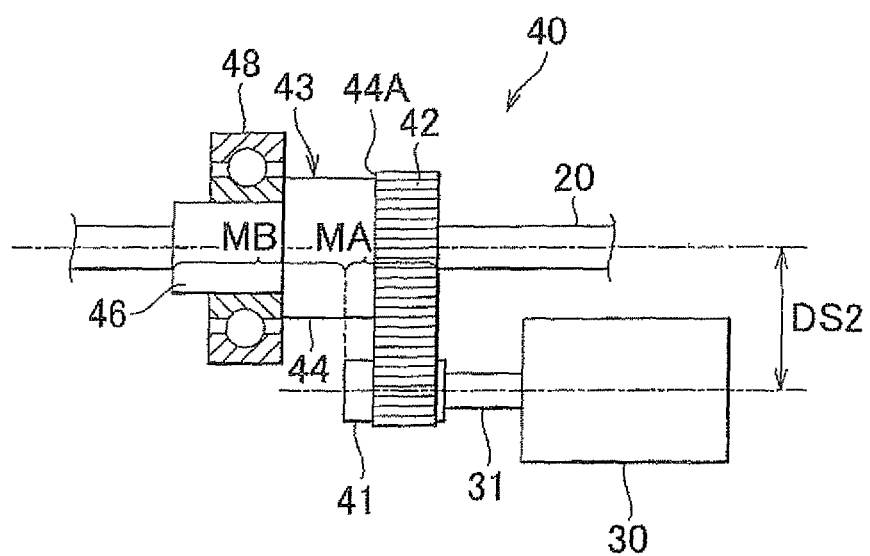
FIG. 4 is a schematic view showing a general structure of the gear mechanism in the steering system of the first embodiment.

Referring to FIG. 3 and FIG. 4, the gear mechanism 40 and a gear mechanism 140 having a known structure will be compared with each other. In the gear mechanism 140 having the known structure, as shown in FIG. 3, the bearing 48 is provided on the opposed surface MA of the outer circumferential surface of the nut 43, and the receiving portion 44A that engages with the belt 42 is provided on the Opposed surface MA of the outer circumferential surface of the nut 43. Also, the motor 30 and the bearing 48 are disposed on the same side of the belt 42 as viewed in the axial direction of the rack shaft 20. Thus, the bearing 48 is interposed between the nut 43 and the output shaft 31 of the motor 30. Therefore, the center distance DS1 between the axis of the rack shaft 20 and that of the output shaft 31 is determined in view of the dimensions of the bearing 48.

On the other hand, the gear mechanism 40 as described above has the following structure. As shown in FIG. 4, in the gear mechanism 40, the bearing 48 is provided on the non-opposed surface MB of the outer circumferential surface of the nut 43, and the receiving portion 44A that engages with the belt 42 is provided on the opposed surface MA of the outer circumferential surface of the nut 43. Also, the motor 30 is disposed on one side of the belt 42 as viewed in the axial direction of the rack shaft 20, and the bearing 48 is disposed on the other side of the belt 42 as viewed in the axial direction. Thus, the bearing 48 is not interposed between the nut 43 and the output shaft 31 of the motor 30; therefore, the center distance DS2 between the axis of the rack shaft 20 and that of the output shaft 31 is smaller than the center distance DS1 of the known structure.

Figure 5:
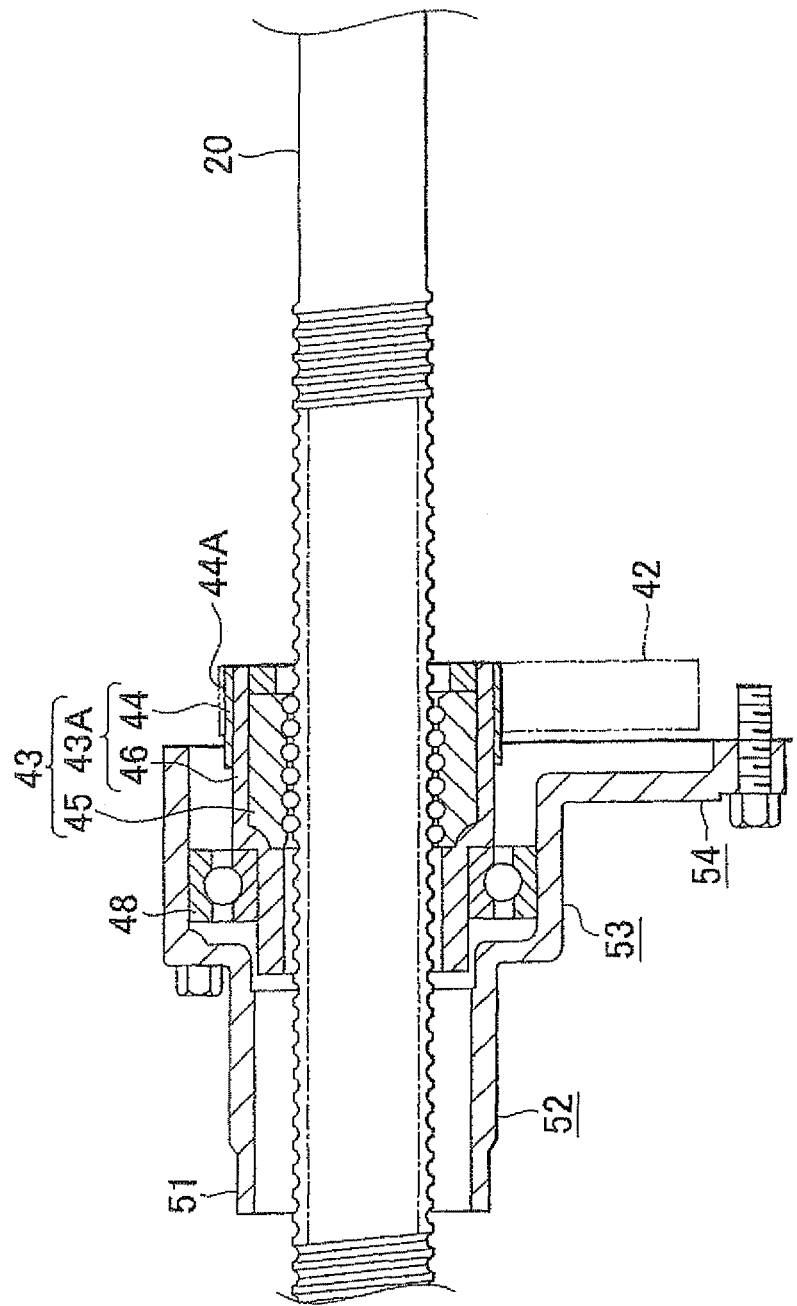
FIG. 5 is a cross-sectional view showing a cross-sectional structure of the steering system of the first embodiment, in a condition before the second housing is mounted on the first housing.

Referring to FIG. 5, an assembly operation for the steering system 1 of the first embodiment will be described. Initially, the bearing 48, nut case 46 and the second pulley 44 are mounted on to the first housing 51. Then, an assembly of the rack shaft 20 and the ball screw 45 is inserted through the nut 43. The resulting structure is shown in FIG. 5. Then, the belt 42 is looped over the second pulley 44, and the second housing 60 is attached to the first housing 51. Finally, the motor 30 is mounted on the second housing 60.

The first embodiment yields the following effects.

(1) In this embodiment, where the opposed surface MA denotes the portion of the outer circumferential surface of the nut 43 which is opposed to the output shaft 31 of the motor 30, and the non-opposed surface MB denotes the portion of the outer circumferential surface of the nut 43 other than the opposed surface MA, the receiving portion 44A that engages with the belt 42 is provided on the opposed surface MA, and the bearing 48 is provided on the non-opposed surface MB.

With the above arrangement, the bearing 48 is provided on the non-opposed surface MB, namely, the bearing 48 is not provided between the motor 30 and the rack housing 50. Therefore, the space between the motor 30 and the rack housing 50 can be reduced, and the center distance DS2 between the output shaft 31 of the motor 30 and the rack shaft 20 can be reduced to be smaller than the center distance DS1 of the known structure.

(2) In this embodiment, the rack housing 50 supports the rack shaft 20 via the bearing 48, and includes the first housing 51 that houses a portion of the rack shaft 20, and the second housing 60 that houses another portion of the rack shaft 20 and supports the motor 30.

With the above arrangement, the rack shaft 20 is supported by the first housing 51, and the motor 30 is supported by the second housing 60. Thus, each structure of a power transmitting mechanism (gear mechanism 40) that transmits rotative power of the motor 30 to the rack shaft 20 and the motor 30 are supported by the rack housing 50, so that the position of each structure of the gear mechanism 40 relative to the motor 30 is prevented from being shifted or changed.

Referring to FIG. 6 through FIG. 9, a second embodiment of the invention will be described. A steering system 2 of this embodiment is provided by adding the following change to the arrangement of the first embodiment. Namely, in the first embodiment, the motor 30 is supported by the second housing 60, while the belt 42, second pulley 44, nut case 46 and the bearing 48 are supported by the first housing 51. In the second embodiment, on the other hand, the motor 30, belt 42, second pulley 44, nut case 46 and the bearing 48 are supported by a single housing. In the following, differences from the arrangement of the first embodiment, which arise from the above change, will be described in detail. In the description of the second embodiment, the same reference numerals are assigned to the same or corresponding constituent elements as those of the first embodiment, and further explanation of these elements will not be provided.

Figure 6:
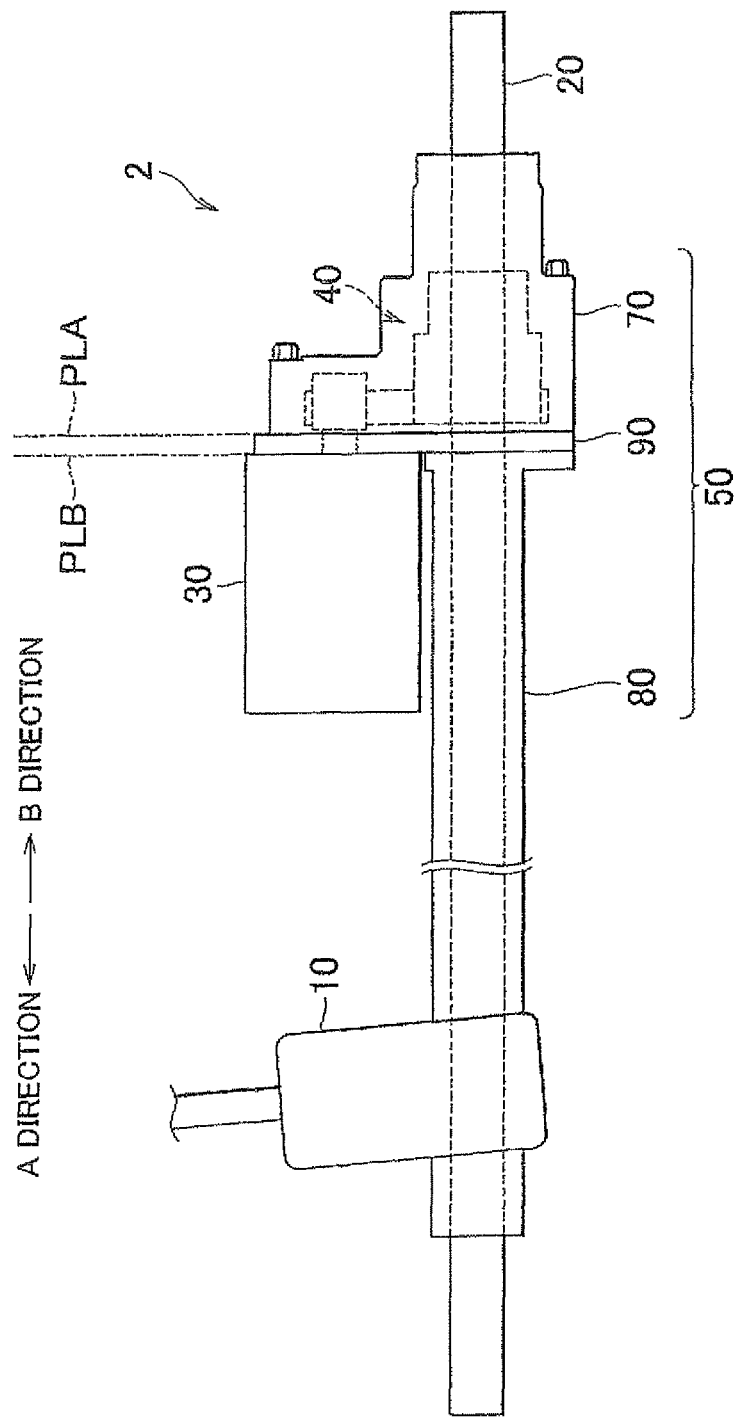
FIG. 6 is a schematic view schematically showing the overall structure of a steering system according to a second embodiment of the invention.
Figure 7:
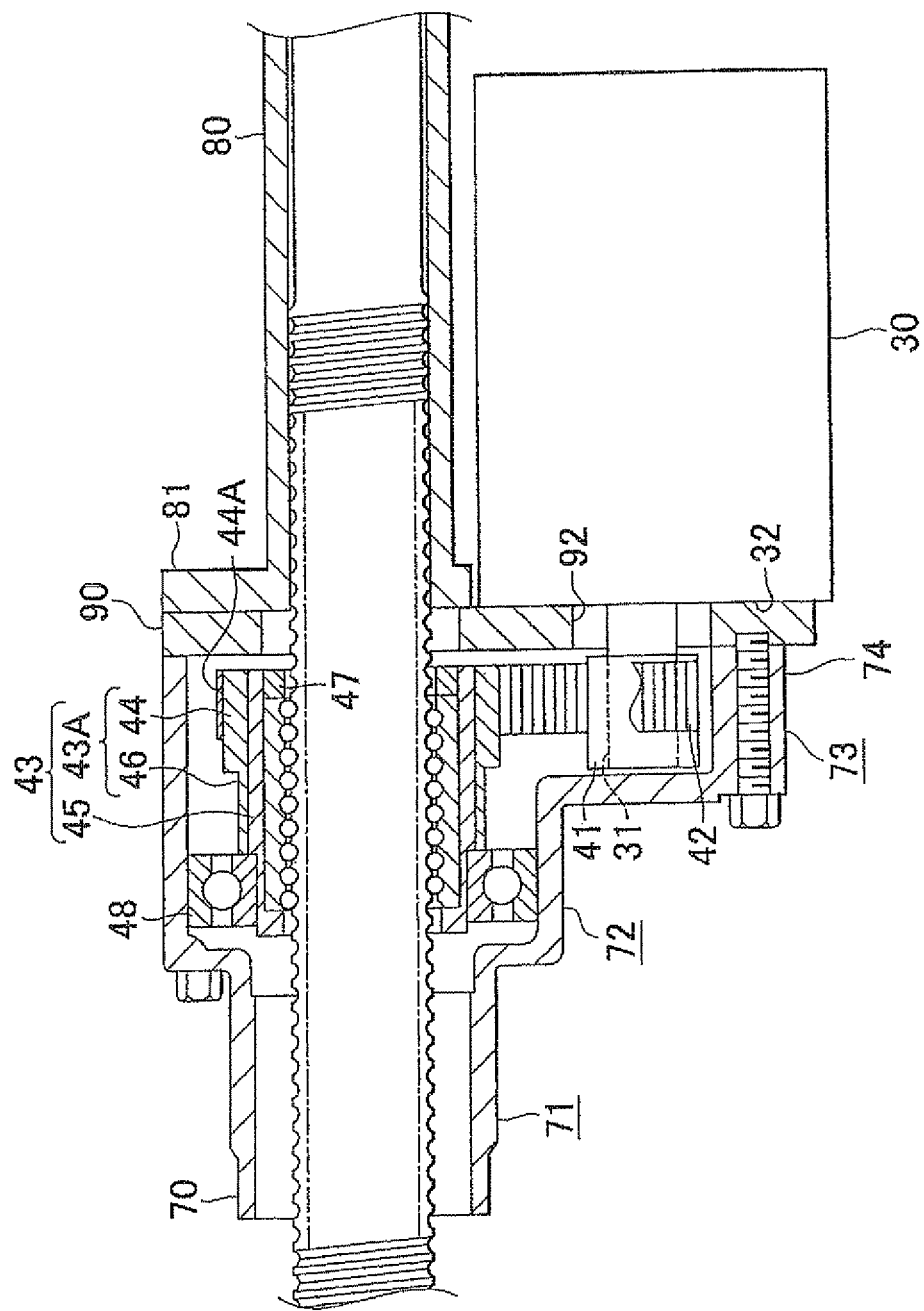
FIG. 7 is a cross-sectional view showing a cross-sectional structure of a gear mechanism in the steering system of the second embodiment.
Figure 8:
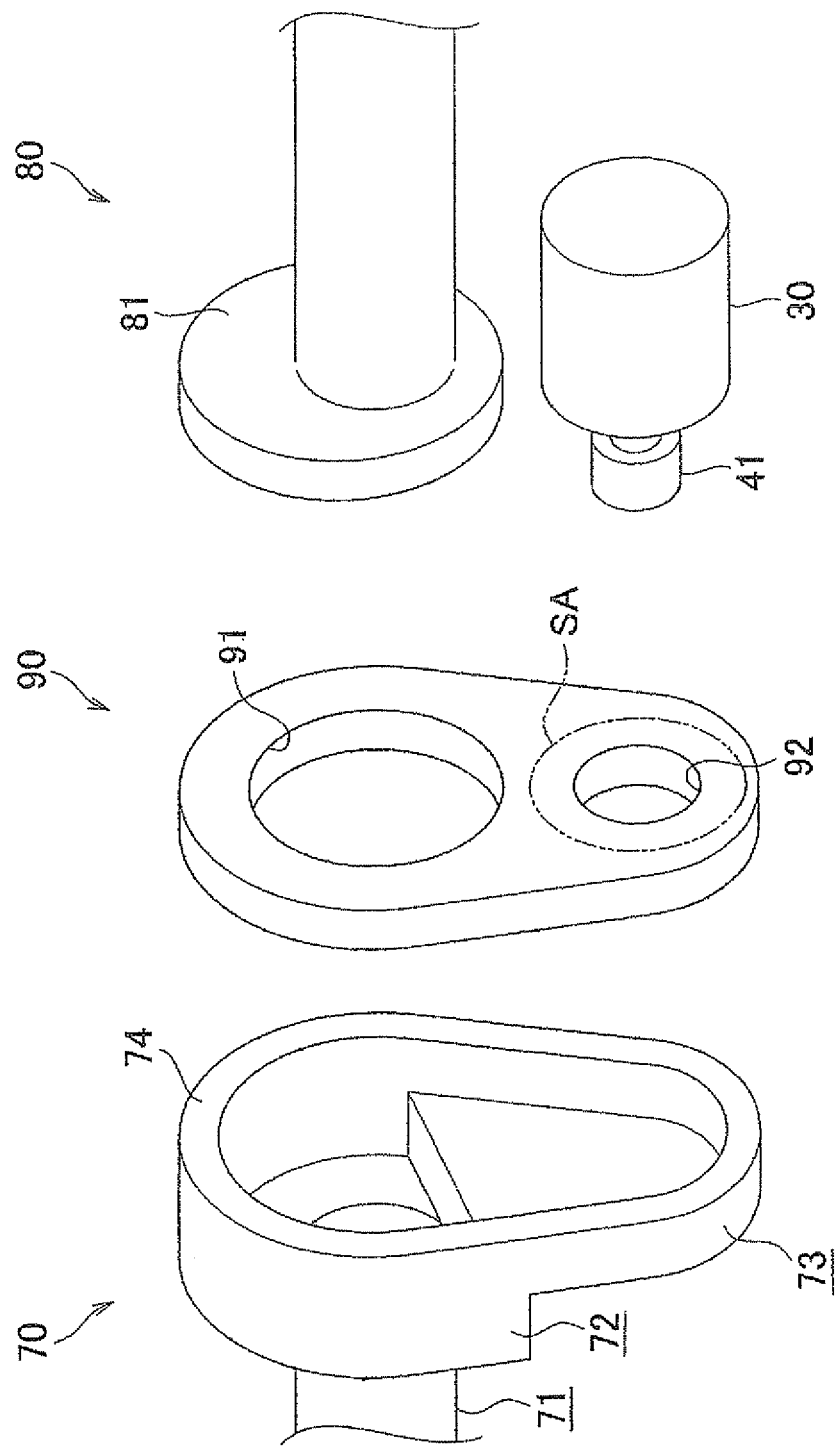
FIG. 8 is a perspective view showing an exploded structure of a third housing, a seal member, and a fourth housing, in the steering system of the second embodiment.

Referring to FIG. 6 through FIG. 8, the structure of the rack housing 50 of the steering system 2 will be described. As shown in FIG. 6, the rack housing 50 includes a third housing 70 that houses a portion of the rack shaft 20 which extends from a first position PLA in the B direction, a fourth housing 80 that houses a portion of the rack shaft 20 which extends from a second position PLB in the A direction, and a seal member 90 interposed between the third housing 70 and the fourth housing 80. As shown in FIG. 6, the first position PLA is provided at one side of the gear mechanism 40 which faces in the A direction. The second position PLB is provided at a location shifted further in the A direction from the first position PLA. The seal member 90 and the third housing 70 are joined to each other at the first position PLA. The seal member 90 and the fourth housing 80 are joined to each other at the second position. PLB. The spacing or distance between the first position PLA and the second position PLB is equal to the dimension of the seal member 90 as measured in the width direction.

Referring to FIG. 7, the structure of the gear mechanism 40, and the positional relationship between the gear mechanism 40 and the rack housing 50 will be described. FIG. 7 is an enlarged view of a cross-section of the gear mechanism 40, which is rotated 180 degrees from the position shown in FIG. 6.

The third housing 70 includes an eleventh housing portion 71 that houses a portion of the rack shaft 20, and a twelfth housing portion 72 that extends from an end portion of the eleventh housing portion 71 and houses the nut 43. The third housing 70 further includes a thirteenth housing portion 73 that is formed adjacent to the twelfth housing portion 72, and houses the first pulley 41 of the motor 30. A fourth connecting portion 81 connected to the third housing 70 is formed on a peripheral wall of an end portion of the fourth housing 80, so as to extend outward from the peripheral wall.

As shown in FIG. 8, the seal member 90 is formed from a plate made of iron or aluminum, and the outer periphery of the seal member 90 is shaped in accordance with the shape of the outer periphery of an end portion of the third housing 70. Also, the seal member 90 is formed with a first through-hole 91 through which the rack shaft 20 extends, and a second through-hole 92 through which the output shaft 31 of the motor 30 extends. The dimensions of the first through-hole 91 are determined so that an assembly (which will be called "Tint assembly 100") of the rack shaft 20 and the ball screw 45 can be inserted through the through-hole 91. Namely, the diameter of the first through-hole 91 is larger than the outside diameter of the ball screw 45. The dimensions of the second through-hole 92 are determined so that the output shaft 31 and the first pulley 41 can be inserted through the through-hole 92.

The seal member 90 is mounted on a third connecting portion 74 of the third housing 70, so as to close the connecting position 74 except for the first through-hole 91 and the second through-hole 92. The first through-hole 91 is closed by the fourth housing 80 mounted on a corresponding portion of the through-hole 91. The second through-hole 92 of the seal member 90 is closed by the motor 30 mounted on a corresponding portion of the through-hole 92.

When the motor 30 is mounted on to the seal member 90, the position of the motor 30 is adjusted by increasing or reducing the distance between the rack shaft 20 and the output shaft 31 of the motor 30, so as to adjust the tension of the belt 42 looped over the first pulley 41 and the second pulley 44. Namely, the position at which the motor 30 is fixed moves relative to the seal member 90. In order to maintain the airtightness of the steering system 2, the connecting portion between the motor 30 and the seal member 90 is constructed so that the motor 30 and the seal member 90 are not spaced from each other, and no clearance is formed between the motor 30 and the seal member 90, even if the motor 30 is moved within a predetermined adjustment range SA. More specifically, a peripheral portion of the second through-hole 92 and a front face 32 of the motor 30 are in surface contact with each other, as shown in FIG. 7.

In the process of producing the gear mechanism 40, there is a demand to divide the gear mechanism 40 into two assemblies, namely, the first assembly 100 and a second assembly 200, and assemble the first and second assemblies 100, 200 together to complete the steering system 2, after individually conducting performance evaluations on the first assembly 100 and the second assembly 200. There is also a demand to individually conduct performance evaluations on the first assembly 100 and the second assembly 200, after fabricating the steering system 2.

In the second embodiment, the first assembly 100 consists of the rack shaft 20 and the ball screw 45, as described above. The second assembly 200 consists of the motor 30, belt 42, driven body 43A (the nut case 46 and the second pulley 44), and the bearing 48. With the gear mechanism 40 thus divided into the first and second assemblies 100, 200, an evaluation of at least a contact portion between the rack shaft 20 and the ball screw 45 can be conducted independently of evaluations of the other components. Thus, in the case of this embodiment, the first assembly 100 and the second assembly 200 are fabricated independently of each other.

Figure 9:
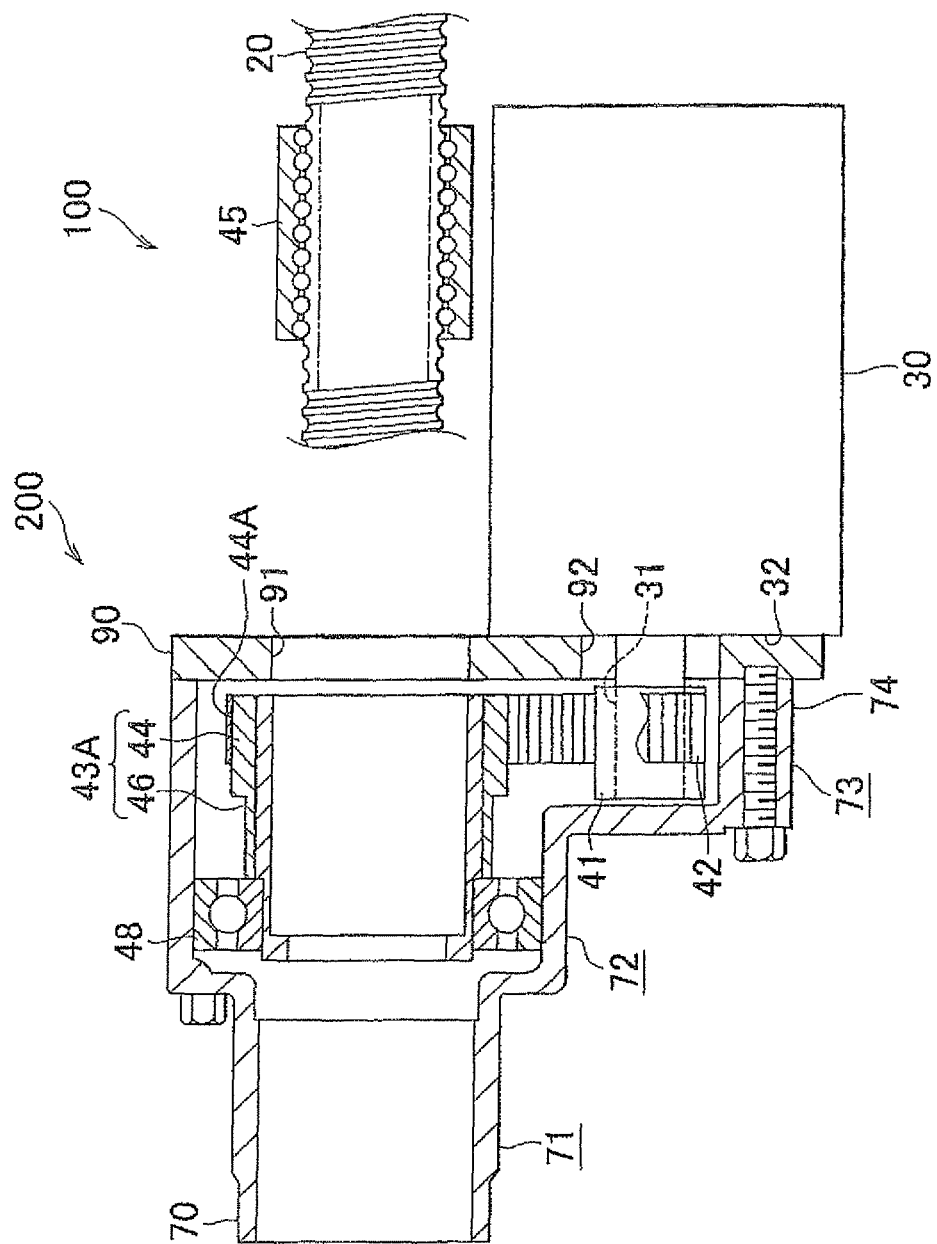
FIG. 9 is a cross-sectional view showing a cross-sectional structure of a first assembly and a second assembly of the steering system of the second embodiment.

Referring to FIG. 9, an assembly operation for the steering system 2 of the second embodiment will be described. Initially, the bearing 48, nut case 46 and the second pulley 44 are mounted on the third housing 70. Then, the belt 42 is looped over the second pulley 44, while the seal member 90 is mounted on the third housing 70, and the motor 30 is mounted on the seal member 90. In this manner, the second assembly 200 is completed. Then, the first assembly 100 (the rack shaft 20 and the ball screw 45) is inserted through the nut 43, and, finally, the fourth housing 80 is mounted on the third housing 70.

Namely, the second assembly 200 can be fabricated without mounting the first assembly 100 in the third housing 70. Also, the first assembly 100 and the second assembly 200 can be separated from each other, by a reverse procedure to the above-described assembly operation.

The steering system 2 of this embodiment further yields the following effects, in addition to the above-described effects (1) and (2) according to the first embodiment. (3) In the second embodiment the third housing 70 supports the motor 30, belt 42, driven body 43A and the bearing 48 mounted thereon. On the other hand, the fourth housing 80 is positioned so as not to overlap the motor 30 in radial directions of the rack shaft 20.

With this arrangement, since the fourth housing 80 is provided separately from or independently of the motor 30, the fourth housing 80 can be removed without removing the motor 30 from the third housing 70. Thus, the first assembly (of the rack shaft 20 and the ball screw 45) can be removed from the third housing 70 in a condition where the Motor 30 remains on the third housing 70. Therefore, even after the steering system 2 is fabricated, performance evaluations can be individually conducted on the first assembly 100 and the second assembly 200, respectively.

(4) in the second embodiment, the third housing 70 supports the motor 30, belt 42, second pulley 44, nut case 46 and the bearing 48 such that these components are mounted on or engaged with each other. As described above, a linear movement mechanism that linearly moves the rack shaft 20 with the rotative power of the motor 30 is constituted by the first assembly 100 and the second assembly 200. Meanwhile, from the viewpoint of the production quality control, it is desirable to assemble the first assembly 100 and the second assembly 200 together, after individually conducting performance evaluations on the first assembly 100 and the second assembly 200. However, if the third housing 70, the fourth housing 80, and the motor 30 are assembled or put together in the following manner, the step of mounting the first and second assemblies on each other cannot be taken after the first and second assemblies are individually fabricated.

Namely, when constituent components of the second assembly 200 other than the motor 30 are supported by one of the third housing 70 and the fourth housing 80, and the motor 30 is supported by the other housing, the components of the second assembly 200 other than the motor do not engage with the motor in a condition where the housings 70, 80 are spaced apart from each other. Therefore, the second assembly 200 cannot be fabricated unless the housings 70, 80 are connected to each other. Accordingly, the second assembly 200 cannot be evaluated alone.

On the other hand, with the above arrangement of the second embodiment, the third housing 70 supports all of the components of the second assembly 200; therefore, the second assembly 200 can be fabricated in a condition in which the third housing 70 and the fourth housing 80 are not connected to each other. Therefore, the first and second assemblies 100, 200 can be mounted on to each other after these assemblies 100, 200 are individually fabricated.

(5) In the second embodiment, the seal member 90 is provided for filling a clearance between the third housing 70 and the fourth housing 80, and a clearance between the third housing 70 and the motor 30. The steering system 2 naturally has the following structure when it is provided with a first structure in which the bearing 48 is provided on the non-opposed surface MB as a part of the outer circumferential surface of the nut 43, and a second structure in which one housing (the third housing 70) supports the motor 30, belt 42, second pulley 44, nut case 46, and the bearing 48. Namely, since the rack shaft 20, belt 42, first pulley 41 and the second pulley 44 are located in the third connecting portion 74 of the third housing 70, the third connecting portion 74 has an elliptical shape. On the other hand, the fourth connecting portion 81 of the fourth housing 80 has a generally circular shape, and the connecting portion of the motor 30 has a circular shape. Therefore, if the fourth housing 80 and the motor 30 are connected to the third housing 70, clearances are formed between the third housing 70, and the fourth housing 80 and the motor 30, and air-tightness cannot be ensured.

On the other hand, with the above-described arrangement of the second embodiment, the seal member 90 fills the clearance between the third housing 70 and the fourth housing 80, and fills the clearance between the third housing 70 and the motor 30, thus assuring air-tightness.

(6) In the second embodiment, no clearance is formed between the motor 30 and the seal member 90, due to the movement of the motor 30 for changing the center distance between the rack shaft 20 and the output shaft 31 of the motor 30.

With this arrangement, even if the motor 30 is moved for adjustment of the position of the motor 30, for example, no clearance is formed between the motor 30 and the seal member 90, and therefore, the air-tightness of the steering system 2 can be maintained.

It is to be understood that the present invention is not limited to the embodiments as illustrated above, but may be embodied with changes or modifications as described below, for example. It is also to be understood that each of the following modified examples is not only applied to the corresponding embodiment, but different ones of the modified examples may be combined and implemented.

While the plate-like seal member 90 is provided between the third housing 70 and the fourth housing 80 in the second embodiment, the seal member 90 may take another form provided that it can fill a clearance(s) formed in a connecting portion of the third housing 70 and the second housing 80 when they are connected to each other. For example, a flange may be provided at an end portion of the third housing 70, and a flange may be provided at an end portion of the motor 30, so that these flanges fill a clearance between the fourth housing 80 and the third housing 70.

In each of the illustrate embodiments, the ball screw 45 converts rotation of the ball screw 45 into linear motion of the rack shaft 20 in the axial direction. Namely, the ball screw 45 may be replaced by another structure or component provided it can convert its rotation into linear motion of the rack shaft 20. For example, a planetary roller screw structure may be employed, in place of the ball screw 45.

While the nut case 46 and the second pulley 44 are separate or non-integral bodies in each of the illustrated embodiments, the nut ease 46 and the second pulley 44 may be formed as an integral body or unit. With this arrangement, the number of components of the nut 43 can be reduced.

While a speed reducing mechanism that consists of the first pulley 41, second pulley 44 and the belt 42 is provided in each of the illustrated embodiments, the belt may be replaced by a chain. Also a speed reducing mechanism consisting of gears may be employed in place of the speed reducing mechanism as described above.

In each, of the illustrated embodiments, the invention is applied to the steering system 1, 2 in which the motor 30 is positioned such that the rack shaft 20 and the output shaft 31 of the motor 30 extend in parallel with each other. However, the invention may also be applied to a steering system in which the motor 30 is positioned such that a certain angle is formed between the rack shaft 20 and the output shaft 31 of the motor 30. In this case, too, effects similar to the effects of each of the illustrated embodiments can be obtained.

What is claimed is:

1. A steering system comprising:
   a power transmitting member;
   a motor that rotates the power transmitting member;
   a rotating body to which rotative power of the motor is transmitted via the power transmitting member;
   a rack shaft that is driven in an axial direction thereof in accordance with rotation of the rotating body;
   a rack housing that houses the rack shaft and the rotating body; and
   a bearing interposed between the rack housing and the rotating body, wherein:
   an outer circumferential surface of the rotating body includes an opposed surface that is opposed to an output shaft of the motor, and a non-opposed surface other than the opposed surface; and
   the rotating body has a receiving portion that is provided at the opposed surface and engages with the power transmitting member, and the bearing is provided on the non-opposed surface.

2. The steering system according to claim 1, wherein the motor is located on one side of the power transmitting member as viewed in the axial direction of the rack shaft, and the bearing is located on the other side of the power transmitting member.

3. The steering system according to claim 1, wherein the rack housing comprises a first housing that supports the rack shaft via the bearing, and houses a portion of the rack shaft, and a second housing that houses another portion of the rack shaft, and supports the motor.

4. The steering system according to claim 3, wherein the first housing further houses a portion of the rotating body and the bearing, and the second housing further houses a remaining portion of the rotating body.

5. The steering system according to claim 1, wherein:
   the rotating body comprises a driven body to which the rotative power of the motor is transmitted via the power transmitting member, and a screw mechanism that rotates with the driven body and converts the rotative power into linear motion of the rack shaft;

the rack shaft is driven in the axial direction in accordance with rotation of the screw mechanism;

the bearing is interposed between the rack housing and the driven body;

the rack housing comprises a first housing that houses a portion of the rack shaft, and supports the motor, the power transmitting member, the driven body, and the bearing, which are mounted on the first housing, and a second housing that houses another portion of the rack shaft; and the second housing and the motor do not overlap each other as viewed in a radial direction of the rack shaft.

6. The steering system according to claim 5, further comprising a seal member that fills a clearance between the first housing and the second housing, and a clearance between the first housing and the motor.

7. The steering system according to claim 6, wherein the seal member is constructed so that no clearance is formed between the motor and the seal member when the motor is moved so as to change a distance between the rack shaft and the output shaft of the motor.

8. The steering system according to claim 6, wherein the seal member has a first through-hole through which the rack shaft extends, and a second through-hole through which the output shaft of the motor extends.

9. The steering system according to claim 1, wherein the power transmitting member is a belt that is engaged with the receiving portion and a first pulley, and the first pulley is mounted on the output shaft of the motor.

10. The steering system according to claim 1, wherein an output shaft of the motor is arranged substantially parallel to the rack shaft.

11. The steering system according to claim 1, wherein the rotating body is mounted on the rack shaft.

12. The steering system according to claim 1, wherein an output of the motor is transmitted to the rack shaft without using a pinion.

13. The steering system according to claim 1, wherein the bearing is not provided on the opposed surface.

14. The steering system according to claim 1, wherein the bearing is provided only on the non-opposed surface.

* * * * *